United States Patent [19]
Caron et al.

[11] Patent Number: 6,056,041
[45] Date of Patent: *May 2, 2000

[54] METHOD AND APPARATUS FOR CONTROLLING THE TEMPERATURE OF AN INGOT DURING CASTING, PARTICULARLY AT START UP

[75] Inventors: Yves Caron; Ghyslain Dubé, both of Chicoutimi, Canada; Friedrich Müller, Schifferstadt, Germany; Marc Auger, Kitimat, Canada

[73] Assignee: Alcan International Limited, Montreal, Canada

[*] Notice: This patent is subject to a terminal disclaimer.

[21] Appl. No.: 08/873,786

[22] Filed: Jun. 12, 1997

[51] Int. Cl.$^7$ ........................................ B22D 11/22
[52] U.S. Cl. ........................ 164/455; 164/154.7
[58] Field of Search .................... 164/455, 452, 164/487, 151.4, 154.6, 155.6, 444, 154.7; 29/407.01, 407.05; 374/166, 179

[56] References Cited

U.S. PATENT DOCUMENTS

| | | | |
|---|---|---|---|
| 3,821,562 | 6/1974 | Davis et al. | 307/117 |
| 3,829,849 | 8/1974 | Stauffer | 340/248 E |
| 4,024,764 | 5/1977 | Shipman et al. | |
| 4,463,795 | 8/1984 | Chielens et al. | 164/455 |
| 4,552,465 | 11/1985 | Anderson | 374/179 |
| 4,660,619 | 4/1987 | Nettelbeck et al. | |
| 4,756,357 | 7/1988 | Bänninger et al. | |
| 4,987,950 | 1/1991 | Yu | |
| 5,061,083 | 10/1991 | Grimm et al. | 374/112 |

FOREIGN PATENT DOCUMENTS

| | | |
|---|---|---|
| 822743 | 3/1975 | Belgium . |
| 1941816 | 8/1969 | Germany . |
| 1948461 | 9/1969 | Germany . |
| 1941816 | 4/1971 | Germany . |
| 60-56460 | 4/1985 | Japan ..................................... 164/452 |

OTHER PUBLICATIONS

Correlation of Surface Temperatures and Heat Transfer by D.C. Casting of Aluminum Ingots, Kraushaar et al., Light Metals 1995, pp. 1,055–1,059.

Importance of Understanding Ingot Butt Cooling Conditions at Cast Start-up: A Case Study, Yves Caron et al., Light Metals 1996, pp. 963–969.

Patent Abstracts of Japan [vol. 010, No. 238 (M–508), Aug. 16, 1986] Abstract of JP 61–071162 A (Apr. 1986).

Primary Examiner—Kuang Y. Lin
Attorney, Agent, or Firm—Cooper & Dunham LLP

[57] ABSTRACT

A method of controlling a temperature of a surface of a direct chill cast ingot cast in an open-ended mold provided with a bottom block during early stages of casting as the ingot emerges from the open-ended mold. The method involves the steps of directing a flow of a coolant onto at least one surface of an ingot emerging from an open-ended mold to impinge on the surface at a normal impingement point and to cool the surface, measuring a surface temperature on the emerging ingot at at least one measurement location which is at a predetermined position close enough to the normal impingement point to be affected by the secondary coolant, to generate a measured surface temperature, determining the displacement of the bottom block of the casting machine from its initial position at the start of the cast, corresponding to each the surface temperature measurement, and using the measured surface temperature to control a casting variable and thereby to control the temperature of the surface. The invention also relates to apparatus for carrying out the above method and to a method of measuring the surface temperature.

27 Claims, 5 Drawing Sheets

METHOD AND APPARATUS FOR CONTROLLING THE TEMPERATURE OF AN INGOT DURING CASTING, PARTICULARLY AT START UP

BACKGROUND OF THE INVENTION

I. Field of the Invention

This invention relates to a method and apparatus for controlling the temperature or degree of cooling of an ingot during casting. More particularly, the invention relates to a method and apparatus for controlling the skin temperature or degree of cooling of an ingot during start-up of casting.

II. Background Art

During direct chill (DC) casting of aluminum and aluminum alloys in an open-ended mould, the cast ingot is subjected to three kinds of cooling, i.e. primary cooling (heat is extracted through the mould face), secondary cooling (the temperature of the ingot surface is controlled by spraying or injecting using a liquid jet coolant on the solidified surface of the ingot as it exits from the casting mould) and bottom block or stool cap cooling (heat is extracted through a solid starting block used to initiate the casting process). As primary cooling and bottom block cooling are not easily modified or adjustable in time, the secondary cooling is the main means of affecting the skin temperature profile of the cast ingot or the degree of cooling as it is being formed. Proper control of secondary cooling is required to prevent a variety of casting problems and ingot defects. Excessive or insufficient cooling may be responsible for ingot defect formation such as excessive butt curl, resulting in severe bleeding on short sides of rectangular cross-section ingots, cold folding requiring extra scalping before hot rolling, and cracking caused by excessive thermo-mechanical stresses.

This problem is particularly acute during the start-up phase of such a DC casting process, as the thermal and mechanical behaviour of the ingot butt is in a transient phase which can cause high thermal and mechanical stresses. Using the combined effect of the three types of cooling, but particularly through modification of the cooling effect of secondary cooling, the aim has been to progressively increase the ingot cooling until a steady state is reached without causing product defect formation. It has not been possible to determine quantitatively the combined cooling effect of all individual parameters influencing ingot cooling. Consequently, corrective actions have often been based on the personal experience of the operator, or by trial and error. This often renders process control very difficult, particularly when there is a lack of experience with new alloys, products or new casting technologies.

A variety of techniques are known for the modification of the cooling effects of the secondary cooling, such as "pulsed water" as disclosed in U.S. Pat. No. 3,441,079, or gas injection as disclosed in U.S Pat. No. 4,693,298. However, these techniques have generally been pre-programmed and do not use any feedback of the ingot condition to modify the application of the control. Therefore, they are unable to respond to variations in the coolant properties, mould cooling variations, metal temperature, casting speed, etc.

German patent DE 1,941,816 (assigned to VAW) proposes the use of a temperature measurement probe which contacts the ingot surface as a means to provide direct temperature feedback to control the coolant application. The probes are attached to a wheel device which allows contacts to be made as the ingot descends. It is disclosed that the device is used to control coolant flow to compensate for heat flux changes and changes in coolant properties. Such a temperature measurement probe consists of a pair of contacts of differing metals which, on making contact with the ingot surface, generates a thermal electromotive force (emf) which is interpreted as the surface temperature at that location. However, this means that the measurement technique relies on uniform surface contacts since there is no means of verifying measurement validity, particularly when the temperature varies along the cast ingot, for example at the start of casting. Because of the size of the wheel, the device has limitations as to where it can be located and the necessarily large spacing between contact points.

There is therefore a need to be able to reliably measure and control the ingot surface temperature as the ingot emerges from the mould even in the early stages of casting when the temperature varies substantially and, furthermore, there is a need for a method of controlling coolant delivery or properties so that it will permit reliable early-stage casting of ingots that are prone to crack during start-up.

SUMMARY OF THE INVENTION

An object of the present invention is provide a method of controlling the temperature of a surface of a DC cast ingot to ensure that a desired cooling profile is achieved.

Another object of the invention is to provide a means for controlling the temperature of a DC cast ingot during casting start-up so that defects in the resulting ingot are avoided.

Yet another object of the invention is to provide apparatus for achieving the above objects.

According to one aspect of the invention, there is provided a method of controlling a temperature of a surface of a direct chill cast ingot cast in a casting machine having an open-ended mould provided with a bottom block during early stages of casting as said ingot emerges from said open-ended mould, the method comprising: directing a flow of a coolant onto at least one surface of an ingot emerging from an open-ended mould to impinge on said surface at a normal impingement point and to cool said surface, measuring a surface temperature on said emerging ingot at at least one measurement location which is at a predetermined location sufficiently close to said normal impingement point that the surface temperature is affected by said flow of coolant, to generate a measured surface temperature, determining the length of said ingot, being a displacement of the bottom block of said casting machine from its initial position at the start of the cast, corresponding to each said surface temperature measurement, and using said measured surface temperature to control a casting variable and thereby to control said temperature of said surface.

According to another aspect of the invention, there is provided an apparatus for controlling a temperature of a surface of a direct chill cast ingot during early stages of casting from a casting machine having an open-ended casting mould, said apparatus comprising: an open-ended casting mould; a first surface temperature sensor located at a predetermined position with respect to a normal secondary coolant impingement point established for the said casting mould, said temperature sensor forming part of a control system for controlling said surface temperature of said ingot, and generating a signal; a signal conditioner for validating said signal by testing said signal for accuracy and/or precision and if validated, providing an output representative of the surface temperature of said ingot and passing said output to a signal comparator; a signal comparator which compares an output of the first signal comparator to a predetermined control function; and a controller for controlling a casting variable of said casting mould in response to an output of said second signal comparator.

The apparatus preferably has at least one additional temperature sensor located adjacent to the first temperature sensor, and the signal conditioner is a comparator for comparing an output of each of the temperature sensors, and the validation occurs when the signals differ by less than a fixed amount. Preferably, validation occurs when signals differ by less than about 10%, more preferably less than about 5%.

According to yet another aspect of the invention, there is provided a method of measuring a surface temperature of a metal ingot as it is cast from an open-ended casting mould, comprising: measuring a temperature of said surface at a location on said ingot using a first temperature sensor to obtain a first temperature measurement; measuring a temperature of said surface at said location on said ingot using a second temperature sensor to obtain a second temperature measurement; comparing said first temperature measurement and said second temperature measurement; ignoring said temperature measurements if said first and second temperature measurements differ by more than a fixed amount; and selecting one or an average of said first and second temperature measurements as a representation of said temperature of said surface at said location if said first and second temperature measurements differ by less than said fixed amount.

In the above method, the mould preferably includes a controller for controlling a casting variable of the casting mould, and the selected temperature measurement is used by the controller to modify the casting variable when necessary to establish a predetermined surface temperature of the ingot as casting proceeds. For example, if the mould includes secondary cooling equipment for the ingot, the selected temperature may be used by the controller to modify the secondary cooling equipment to maintain the predetermined surface temperature.

In all of the aspects of this invention, the surface temperature may be measured in a variety of ways. It may be measured continuously, for example, using a non-contact optical sensor, or semi-continuously by use of at least one contacting temperature measuring sensor which is brought into contact with the surface on a intermittent basis, preferably in a periodic manner. The non-contact optical sensor may be an infrared or similar sensor. The contacting temperature measuring sensor can be, for example, a thermistor, temperature sensitive resistance element or thermocouple.

As noted above, the surface temperature is preferably measured using a technique wherein each measurement can be independently verified or validated. That is, each temperature (or signal corresponding to that temperature) is preferably tested for accuracy and/or precision independently of measurements taken at different values of the ingot developed length. This may be done for example by providing a system for measuring contact integrity in contact methods or by means of a second adjacent and simultaneous surface temperature measurement.

The surface temperature is accordingly preferably measured by providing at least two contact temperature sensors at the measurement location, periodically bringing the sensors into simultaneous contact with the surface, comparing outputs from each of the sensor, rejecting the outputs if the outputs differ by more than a fixed amount and, if the outputs differ by less than the fixed amount, accepting one or an average of the outputs as a measure of the temperature to be used for control of the coolant.

The casting variable controlled may be the molten metal temperature, the casting speed, or preferably, the degree of cooling by the coolant stream used to provide secondary cooling to the ingot.

The control of the degree of cooling by the coolant stream which is directed against the ingot surface (referred to as the secondary cooling) may be accomplished by a number of methods, including altering the on-off cycle times or cycle lengths in a pulsed flow water, altering the total flow of coolant, altering the gas content (such as the $CO_2$ or air content) of gas-coolant systems, changing the secondary coolant impingement point from its normal point, or altering other properties of the coolant that affect its thermal performance (temperature, levels of oil, other organic and inorganic additives, etc.).

As noted above, the ingot length is defined as the displacement of the bottom block (sometimes referred to as the stool cap) of the casting machine from its initial position, generally inside the open ended mould. Although this defined ingot length may not coincide with the solidified shell of the ingot (for example, the molten metal level may vary in the mould during casting) this method of determining ingot length is a suitable measurement, particularly during the early stage of the cast.

The measured surface temperature of the ingot may be used to control the surface temperature such that the surface temperature lies within a temperature control band having a first section over a first ingot length and an adjacent second section at a larger ingot length than the first section, wherein the surface temperature is controlled within the first section such that the surface temperature is greater than a lower temperature limit which exceeds 120° C. and less than an upper temperature limit for a first ingot length, and the surface temperature is controlled within the second section so that the surface temperature is reduced to 120° C. within an additional incremental ingot length, and thereafter maintained below 120° C.

The temperature control band is preferably solely a function of the ingot horizontal cross-sectional dimensions and the alloy composition. It may be determined empirically for a particular design of mould then used universally. Because of the selection of the temperature measurement location at a predetermined distance with respect to the normal secondary coolant impingement point, this temperature control band no longer depends on specific mould designs or methods of varying the secondary coolant behaviour, and thereby makes the control function transportable from one casting system to another (for the same ingot size and alloy compositions) with minimal modification provided the same predetermined distance with respect to the normal secondary coolant impingement point is used.

The first ingot length is preferably greater than about 100 mm. It is also preferably less than about 600 mm more preferably less than 400 mm.

The additional incremental ingot length preferably lies in the range of 5 to 100 mm, and more preferably in the range 10 to 100 mm.

The lower limit of the first section of the temperature control band should preferably exceed the upper temperature limit of the nucleate boiling regime for the particular coolant and ingot surface, and is more preferably greater than the lowest temperature at which stable film boiling occurs for the coolant and surface used. The nucleate boiling regime and film boiling regime are defined for example in F. Kreith "Principles of Heat Transfer", Chapter 10, published 1965 by International Textbook Company. The lower limit of the first section of the temperature control band is preferably at least 200° C. and more preferably at least 240°. It is most preferably between 240° C. and 450° C.

The lower limit of the first section of the temperature control band can take any suitable functional form (e.g. a constant value, an exponentially decreasing curve, upward or downward sloping line segments, etc.) provided it remains above the reference temperature. The upper limit of the first section of the temperature control band will preferably be less than 550° C., and similarly may take on any suitable functional form.

The second section of the temperature control band may similarly have upper and lower limits in various functional forms and can consist of single or multiple step functions or sloped line segments as long as the surface temperature is reduced to 120° C. in an additional incremental ingot length, and subsequently the final upper limit is less than 120° C. More preferably the final upper limit is less than the atmospheric boiling point of the coolant.

When the coolant is water, the atmospheric boiling point may be taken as 100° C.

The measured surface temperature of the ingot may also be used to control the surface temperature by control of a casting parameter, for example the degree of cooling of the secondary coolant, between successive casts rather during a single cast by following a method wherein a first ingot is cast according to a known first cooling sequence, determining for the first cast a set of parameters comprising at least one parameter selected from (a) the specific first ingot length at which the measured temperature falls sharply (determined by a maximum in the derivative of the measured temperature), (b) the value of the measured temperature at that specific first ingot length, (c) a single parameter selected from a group consisting of an average, a gradient, or an integral of the measured surface temperature for lengths of ingot up to the specific first ingot length, and (d) the specific increment of ingot length over which the measured temperature falls from the value at the specific first ingot length to a value less than 120° C., comparing the parameters to a pre-determined set of parameters, and changing the cooling sequence according to the difference between the set of parameters and the pre-determined set of parameters.

Further corrections may be applied, if necessary, between subsequent casts until the calculated parameters match the target values.

The temperature measurement location should preferably be established no more than 400 mm below the normal secondary coolant impingement point. However, to permit more complete definition of the measured surface temperature (either as a curve or in terms of one or more parameters), which is one advantage of the present invention, the temperature measurement is preferably taken no more than 100 mm below the normal secondary coolant impingement point, more preferably between 5 mm above and 30 mm below, and most preferably between 5 and 15 mm below, the normal secondary coolant impingement point. In this description "above" means between the normal secondary coolant impingement point and the exit surface of the mould.

The normal secondary coolant impingement point is generally described as the location (taken with respect to the mould) at which the local heat extraction rate caused by the secondary coolant, measured in the steady state, is a maximum. It will therefore be seen that, in this context, the term "normal" is used in the sense of "usual" and does not imply that the secondary coolant impinges on the surface of the ingot at right angles (which, in fact, it usually does not). The normal secondary coolant impingement point is an impingement point that is established by the mould design (e.g. the secondary coolant port discharge angle and distance of the secondary discharge ports from the ingot surface). This may vary at different locations around the mould periphery and therefore the physical location of the temperature measurement location (and the mounting of the sensors required to make the measurement) must be established for each mould design to ensure that the correct temperature measurement location with respect to the normal secondary coolant impingement point is established. The temperature measuring probes which are used to measure the ingot surface temperature at the temperature measurement location will normally be attached mechanically to the exit surface of the open ended mould (the bottom surface of the mould in vertical DC casting) and their position with respect to the mould lower surface will differ in different casting systems depending on where the normal secondary coolant impingement point lies in that system. In most conventional DC casting mould designs of the vertical type, this will require a measurement location within about 50 mm of the exit surface of the mould, thereby making a mechanical attachment to the mould easy to achieve.

In common mould designs used for vertical DC casting, where secondary coolant is applied as one or more highly directed jets, the normal secondary coolant impingement point may be conveniently taken as the observed point of secondary coolant impingement furthest from the exit surface of the mould when the maximum coolant flow is used. In certain mould designs, secondary coolant may be specifically removed from an ingot (e.g. by air knife, wiper, etc) but this does not affect the above definition. Coolant flow may be altered during the start-up of the casting procedure, for example by using variable (pulsed flows), adjustable deflector plates of multiple secondary coolant discharge ports, some of which are used only during the start-up phase. Use of the observed impingement point as defined above avoids uncertainties caused by such cooling techniques.

The normal secondary coolant impingement point may also be determined empirically by locating the temperature measuring probe at different positions with respect to the mould exit surface and measuring the surface temperature in the steady state (after start up). If the temperature is measured between the mould exit and the normal secondary coolant impingement point the measured surface temperature will be high (typically greater than the film boiling temperature), whilst following the normal secondary coolant impingement point the temperature will be low (typically less than 120° C). The normal secondary coolant impingement point may therefore be taken as the point of maximum gradient of the surface temperature between these two limits.

Where mould designs do not provide such a clearly identifiable impingement points, thermocouples embedded in test ingots, combined if required with thermal models of the ingot in the steady state may be used to calculate the location of the maximum local heat extraction rate The means for controlling the secondary coolant flow or properties may be electrically controlled valves or switches, for example, to alter the amount of gas being added, to turn water on and off, or to continuously vary water flow. Combinations of such means may be required to allow the relatively minor control corrections required during periods of "constant" temperature and the major control corrections that may be necessary to increase the cooling effect after the first value of the developed length. The means may also be audible or visible signals which notify the operator of the casting apparatus to make predefined changes in operation.

The first temperature sensor may be a sheathed thermocouple device consisting of dissimilar metal wires bonded together and contained within a single protective (generally metallic) sheath. However, the first temperature sensor is preferably a two-point contact probe consisting of dissimilar metals that can develop an electromotive force (emf) when brought into contact with the surface, which emf is a function of the temperature of the surface at the contact location.

The at least one additional temperature sensor may be a sheathed thermocouple device, as in the case of the first temperature sensor, but is preferably a two-point contact probe consisting of dissimilar metals than can develop an emf which is a function of the temperature of the surface at the contact location.

It is preferred that there be only one additional temperature sensor, but more could be provided, if desired.

It is particularly preferred that the first and the single additional temperature sensors have one of their two point contacts probes in common.

In the most preferred embodiment, the point contacts probes of each temperature sensor are preferably spaced less than 50 mm apart, and most preferably less than 30 mm apart, and are mounted in a common horizontal plane.

The dissimilar metals are preferably chromel and alumel alloys, although any pair of metals that can develop a measurable emf may be used. However, preferred alloys will generally be selected on the basis of the signal that develops through the Seebeck effect, and the hardness and corrosion resistance of the alloys. Nickel-based alloys are useful in these applications, and hence Type K (chromel-alumel), Type N (nicrosil-nisil), and Type E (chromel-constantan) are preferred combinations.

The temperature sensors are preferably brought into simultaneous contact with the moving surface by means of a pneumatic or electrical drive mechanism (piston or solenoid) causing the sensors to move reciprocally in a direction perpendicular to the direction of motion of the moving surface, or at an angle to the perpendicular, which is preferably less than 45° from the perpendicular. An angled displacement is useful where some obstruction (such as the edge of a DC casting mould or extrusion die) prevents access at the desired measurement location. In the preferred embodiments using pairs of point contact probes as the sensors, the individual point contact probes are brought into contact with the moving surface by means of these pneumatic or electric drive mechanisms.

In these preferred embodiments, and in particular where three point contacts are used to form two adjacent sensors, it is preferred that the individual point contact probes have independent suspension so that although they are moved simultaneously towards the surface or away from it, the actual final position of each point contact probe can adjust to non-uniform surfaces. This can be accomplished, for example, by use of separate pneumatic cylinders or electrical solenoids for each point contact probe, driven from a common source, or through the use of spring loading or similar mechanical loading systems. The use of separate pneumatic cylinders is a particularly simple and preferred method.

The contact tips of the point probes of the preferred sensors should preferably ensure good thermal and electrical contact with the surface to be measured, and the point contact probe tip material, geometry and size, and the load which propels the tip to the surface, are preferably chosen to accomplish this. At temperatures above about 200° C., the load may be sufficient to indent the surface of the ingot. A good thermal and electrical contact ensures fast and accurate temperature response even in the presence of substantial thermal disturbances such as would be encountered in secondary coolant sprays or other quenchant applications.

The output indication may be a voltage or current signal (generally a voltage signal) generated by any conventional means from the emf developed by the thermocouple junctions of the sensors or may be further converted to an output equivalent to the temperature through use of known temperature conversion factors.

The first and at least one additional temperature sensors preferably remain in contact with the surface, and the first and at least one additional temperature measurements are made, while the metal slab moves a distance of 6 mm or less, more preferably 3 mm or less. The signal comparators used to compare the temperatures of the sensors can be dedicated analogue signal comparators, but more conveniently will be a pre-programmed digital computer. Likewise, the signal comparator used to compare the output temperature to the control function will preferably be a pre-programmed digital computer.

The first and at least one additional temperature sensors preferably provide a temperature response of 0.15 seconds or less, preferably 0.10 seconds or less. Temperature response means the time required for the temperature sensor to read within 95% of the final value measured from the time the sensor makes contact with the moving surface.

Semi-continuous measurements may be made intermittently such that measurements occur at steps of between 1 and 15 mm of ingot length, preferably between 2 and 10 mm of ingot length, and they will preferably be periodic, although the period may be altered at different stages of a start-up procedure.

Alternative means to bring the first and at least one additional temperature sensors into simultaneous contact with the moving slab may be selected if they meet the other requirements of such a system. For example, various lever arms may be employed to achieve the contact if desired. However, in most cases, the use of the "in-out" (reciprocal) motion of the preferred embodiments will prove simpler and more convenient.

The method of measuring temperature and controlling cooling is most frequently applied to rectangular cross-section ingots or large round ingots, and for rectangular ingots the ingot temperature is preferably measured at the midpoint of the rolling face of such an ingot.

DETAILED DESCRIPTION OF THE INVENTION

Figure 1:
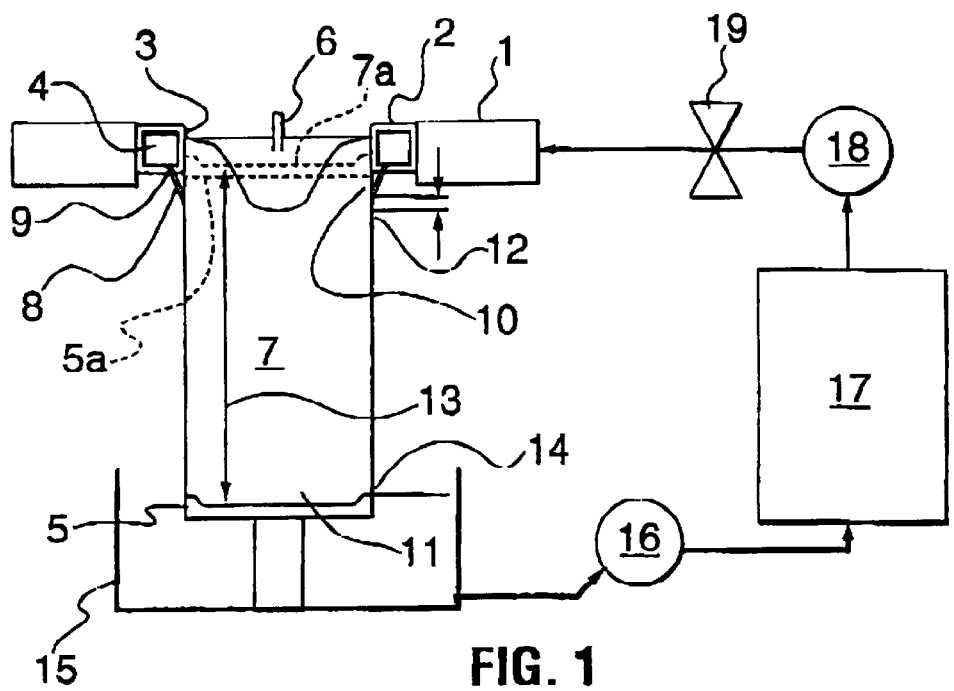
FIG. 1 is a vertical cross-section through a typical DC casting mould and table showing the principal distances and measurement locations used in the method of this invention.

FIG. 1 shows a DC casting machine of the type with which the method and apparatus of this invention may be used. The casting machine consists of a casting table 1 containing one or more casting moulds 2. The casting mould is an open-ended mould with the casting faces 3 cooled by primary cooling channels 4. The casting machine also includes a bottom block or stool cap 5 which is designed to fit within the opening in the casting mould, and can be lowered during operation. Molten metal is fed to each mould by a trough (not shown) and feed pipe 6. At the start of a cast with the bottom block 5 raised to a position 5a (shown in dotted lines) so that it is within the bottom end of the mould, metal is allowed to flow into the mould and begins to freeze to form a shell of an ingot as a result of heat extraction due to the thermal mass of the bottom block and the primary cooling channels 4 through which coolant flows. When the metal reaches a certain level in the mould, the casting machine is generally programmed to start lowering the bottom block 5 and a solidified ingot 7 gradually descends from the mould. An additional flow of coolant 8 (called the secondary coolant) impinges on the outer surface (shell) of the descending ingot to provide additional cooling to complete solidification of the ingot. Unlike the primary cooling which is indirect, the secondary cooling is direct, by coolant impingement on the surface. Generally, the secondary coolant is supplied by outlets 9 from the primary coolant channels such as slots or holes which direct the secondary coolant to strike the ingot surface at a position, which when the full coolant flow is turned on, is defined as the "normal secondary coolant impingement point" 10. Metal is continuously fed to the molten sump 7a of the ingot, and metal flow may be controlled by monitoring the metal level in the sump. The secondary coolant normally drains into a collection sump 15 under the casting machine, from which, in many such installations, it is removed by a pump 16 and delivered to a coolant handling system 17. From the coolant handling system, the coolant is pumped by an additional pump 18 via a coolant control valve 19 to the casting table 1 where it is delivered to the primary coolant channels 2 by means of internal connections or hoses (not shown). The coolant handling system 17 may simply include a discharge to the environment and an intake from a source of coolant (e.g. water), but in many installations, the coolant is partially or totally recycled, and the coolant handling system may include a purification system, coolant makeup, heat exchangers and coolant storage.

During the start-up of a DC cast, the formation of the bottom of the ingot or butt 11 may be accompanied by the creation of substantial stresses which are sufficient to distort the butt shape (referred to as "butt curl"). The resulting crack if too long can cause ingot rejection, and the resultant butt curl, if too high, can cause molten metal to run out and can create a risk of explosion. Smaller cracks, although insufficient to cause a hazard, will result in poorer ingot quality. It is therefore desirable, and a standard casting practice, to maintain the temperature of the butt of the ingot in its initial forming stages at a high value. Once the butt and a portion of the rest of the ingot is formed, the temperature is then reduced substantially to ensure that safe operation is achieved for the rest of the "steady state" portion of the cast and that a good quality ingot is formed. The temperature is maintained at a high or low level mainly through control of the cooling effectiveness of the secondary coolant or through adjustment of other casting parameters such as the metal temperature or casting speed. Thus, for example, a reduced flow of secondary coolant would be used at the start of the cast by adjusting the valve 19, and the flow increased at a certain point in the cast when it is believed that the butt stresses will not cause cracking. The secondary coolant flow may be directly varied to change its cooling effectiveness, or it may be "pulsed" (again by rapidly opening and closing valve 19) to reduce its effectiveness at cooling, or deflected to a less efficient cooling angle. Alternatively, a gas may be added to reduce its heat transfer capabilities. This is generally done by injecting a gas into the coolant at or near the secondary coolant discharge point 9. Once the cast ingot reached the point where cooling must be increased, the secondary coolant effectiveness can be returned to an appropriate level—e.g. by stopping pulsation, stopping gas addition, or returning to the "normal" angle of coolant impingement in order to reach a local heat transfer rate that allows reduction of surface temperature to less than 120° C. and to maintain it below this level for the rest of the cast.

In the present invention, a means for measuring the ingot surface temperature is provided at a defined position 12 with respect to the normal secondary coolant impingement point 10, and the temperatures measured at that location, which is also thereby fixed with respect to the mould, provides a reliable and accurate measurement of the temperature of the ingot, even in the butt forming stages. Repetitive (i.e. periodic), semi-continuous, or continuous measurements taken at the location 12 as the cast starts and the ingot descends from the open-ended mould, permits the temperature profile of the ingot to be tracked as a function of the ingot length 13, measured, as shown, as the displacement of the bottom block 5 from its initial position 5a. During a typical casting operation, a plot of temperature measured at the defined measurement position 12 versus the ingot length 13 would therefore show an initial sharp rise in temperature to a high value, which would remain at this high value until it had been considered that an adequate butt had been formed to prevent cracking, at which point (at some ingot length >0), the temperature would drop rapidly as a result of the increase in cooling initiated at that stage or slightly earlier in the process. The cooling can in certain instances be increased steadily from the start of the cast, and at that point reaches a level such that the temperature drops rapidly. The lower temperature would then be observed throughout the rest of the ingot length to the end of the cast.

While the general approach to the use of a high starting temperature followed by a low temperature is normally used in DC casting of large ingots, such conditions have been achieved by the arbitrary application of different levels of secondary cooling at the different stages of ingot formation, according to various recipes and procedures developed for each alloy, ingot size, mould design, etc., and no corrections or alterations to the application of coolant can be made in response to changes in the cast as it develops. The apparatus and method of the present invention permits a precise determination of ingot temperature at a preferred location 12 with respect to the secondary coolant impingement point 10 as the butt develops and, as a result, permits the direct control of cooling to achieve a desired temperature profile along the developing ingot. This desired temperature profile depends only on the alloy used and the size (horizontal cross-section) of the ingot and does not depend, for example, on the casting mould design or the method by which the cooling capability of the secondary coolant is adjusted.

Figure 2:
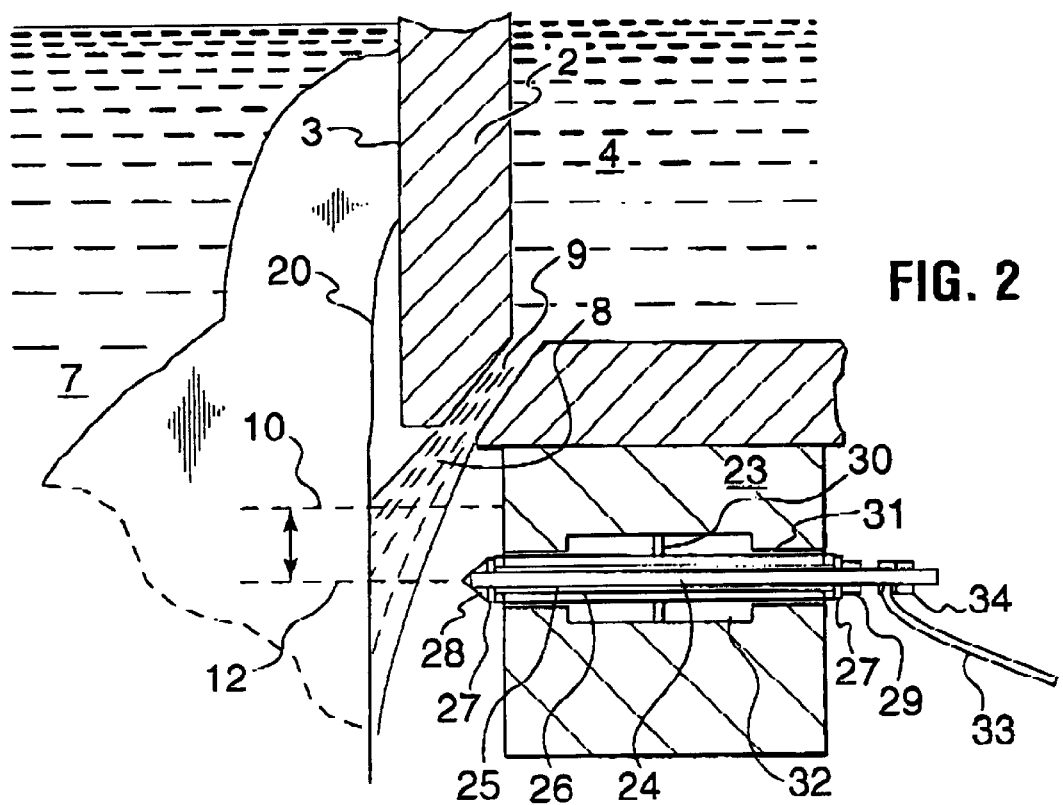
FIG. 2 is a vertical cross-section through a portion the direct chill casting mould and ingot of FIG. 1, and showing one of the preferred contact probes and operating positions according to a preferred embodiment of the present invention.

FIG. 2 shows a part of the mould 2, mould face 3, primary coolant channel 4, secondary water outlet 9, secondary water stream 8, secondary coolant impingement point 10, ingot surface temperature measurement point 12, and ingot 7 of FIG. 1. The ingot face emerging from the mould is represented by the surface 20.

Mounted below the casting mould 2 is a metal block 23 which holds a number of point contact probe pneumatic assemblies (one of which is shown in FIG. 2, more being shown in FIG. 3). Each assembly consists of a metallic point contact probe rod 24, surrounded by a plastic insulating sleeve 25 and contained within a second annular steel sleeve 26. These sleeves are held in position on the probe rods by means of insulating Teflon® washers 27 and threaded retaining nuts 28, 29.

Each annular sleeve has a piston gasket 30 mounted on it and is free to move within a annular hole 31, 32 within the block. The annular hole has an enlarged section 32 to accommodate the piston gasket. Each contact probe rod has an electrical signal wire 33 attached to the end remote from the ingot surface by means of locknuts 34.

Figure 3:
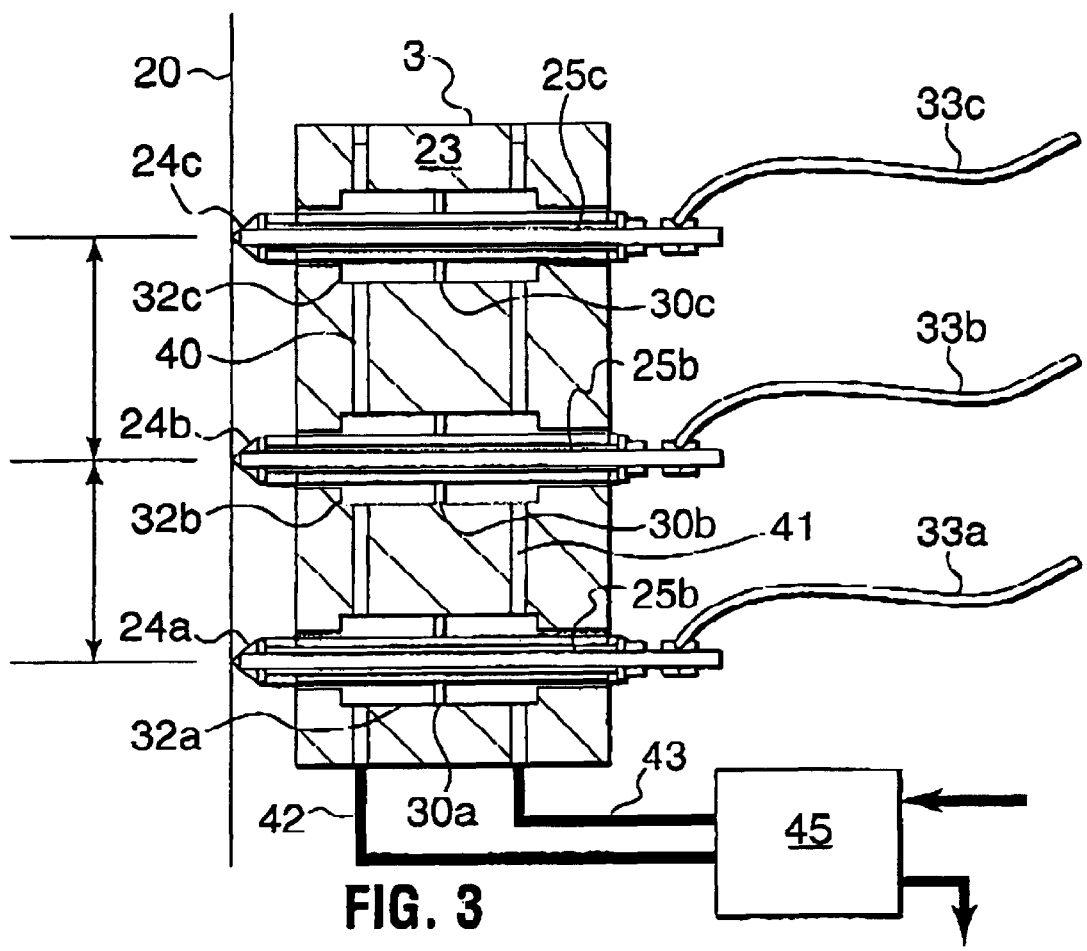
FIG. 3 is a plan view showing a complete assembly of the preferred contact probes shown in FIG. 2.

Three such pneumatic assemblies are shown in more detail in FIG. 3 which includes three point contact probes 24a, 24b, 24c, each mounted in an assembly as previously described. Within the steel mounting block, air passages 40, 41 are drilled to interconnect the enlarged sections of the annular channels in which the probes move. Airline connections 42, 43 are provided to drive the cylinders horizontally in two opposite directions alternately within the cavities. The ends of the point contact probes which are adjacent to the ingot surface are pointed to improve contact with the ingot surface. The angle of the point is selected empirically to reduce the amount of tip wear and flattening that can occur with repeated use. Electrical connections 33a, 33b, 33c are made with the contacts so that the response can be measured using an external circuit described in more detail later.

Point contact probes 24a and 24c are fabricated from one metal and contact 24b is fabricated from a different metal. The corresponding electrical connections are also made of the same metal. Typically, point contact probes 24a and 24c are fabricated from alumel and point contact probe 24b of chromel, but any combination of metals that gives a thermal emf response may be used.

During a typical DC casting operation, the point contact probes 24a, 24b, 24c are positioned so that they lie in a plane such that the tips of the point contact probes, when pushed forward by the action of the pneumatic cylinders, touch the ingot surface 20 at position 12, which may fall anywhere in a range between 5 mm above the secondary coolant impingement point 10, and 30 mm below the secondary coolant impingement point 10, preferably between 5 and 15 mm below the secondary coolant impingement point 10. It has been determined that when the probe is used in this position, the measured temperature is representative of the thermal state of the ingot, particularly during start-up of the cast. If it lies more than 5 mm above the impingement point, then the probe will fail to measure the effects of secondary coolant which are of major importance in controlling the casting, particularly during start-up. If it lies more that 30 mm below the impingement point, the probe response will be affected by the gradual averaging of temperatures following the application of coolant and will no longer have the sensitivity to show the detailed effects of the secondary coolant on the surface, although certain information (of an increasingly limited scope) can be obtained up to about 400 mm from the impingement point.

In operation, the point contact probes forming the sensors of the present invention are moved simultaneously in the forward direction to make contact with the ingot surface 20, by simultaneous activation of all three pneumatic cylinders 32a, 32b, 32c as shown in FIG. 3. Each of the cylinders 32a, 32b, 32c is machined within the block 3 and fed simultaneously by airlines 42 and 43. When pressure is applied to airline 42, and airline 43 is open to atmosphere, all three point contact probes 24a, 24b and 24c are moved towards the ingot surface 20 by the pistons 30a, 30b, 30c. When pressure is applied to airline 43, and airline 42 is open to atmosphere, the three contacts are moved back from the surface. The direction of air flow is controlled by a double acting pneumatic valve 45, attached to an air supply source (not shown). The point contact probe tips are held against the ingot surface 20 for a short period of time and then retracted by the pneumatic cylinders. During the time of contact with the surface, the surface may move as much as 6 mm vertically, but preferably only 3 mm or less, and the vertical play in the insulating sleeves 25a, 25b, 25c allows the point contact probes to engage the surface without scraping or gouging. Vertical play may also be achieved by mounting block 3 on a pivot rather than fixing it directly to the bottom of the casting mould in which case the surface may move a greater distance.

Although the three point contact probes are moved against the ingot surface simultaneously, the use of separate pneumatic cylinders permits the point contact probes to conform to ingot surface irregularities. A similar flexibility may be obtained, for example, by use of a single activating cylinder with spring loaded contact tips.

The pneumatic cylinders preferably operate with a pressure of about 90 psig. For a chromel or alumel alloy rod 6 mm in diameter with a point angle of about 30°, an adequate force is developed to make a reliable thermal and electrical contact with the ingot surface.

Whilst in contact with the surface, the emfs developed between contacts 24a and 24b and between 24b and 24c are measured. Several such measurements are made, generally at a frequency of 40 per second. Because the contacts are making direct electrical connection with the surface, the measurements stabilize at a final value within less than 0.15 seconds. The emfs from the two sensors (formed by the overlapping pairs of point contact probes) are converted to equivalent detected temperature based on the known response for the metals used in the point contact probes. The point contact probes are generally positioned less than 30 mm apart so that the intervening aluminum surface between the point contact probes does not affect the measurements. Thus, where chromel and alumel metals are used, the emf developed is typical of that found in a "Type K" thermocouple. The two simultaneously detected emfs, converted to a voltage or equivalent temperature, are then compared. If they differ by more than about 10%, preferably more than about 5%, the measurement is rejected for control purposes. Otherwise the maximum of the two detected voltages or temperatures is indicated and recorded as being the output most accurately measuring the actual surface temperature at that point. Of course, if desired, the lower detected temperature could be used, or an average of the two could be provided, as the indicated surface temperature, but for greatest accuracy, the maximum value is used.

Figure 4:
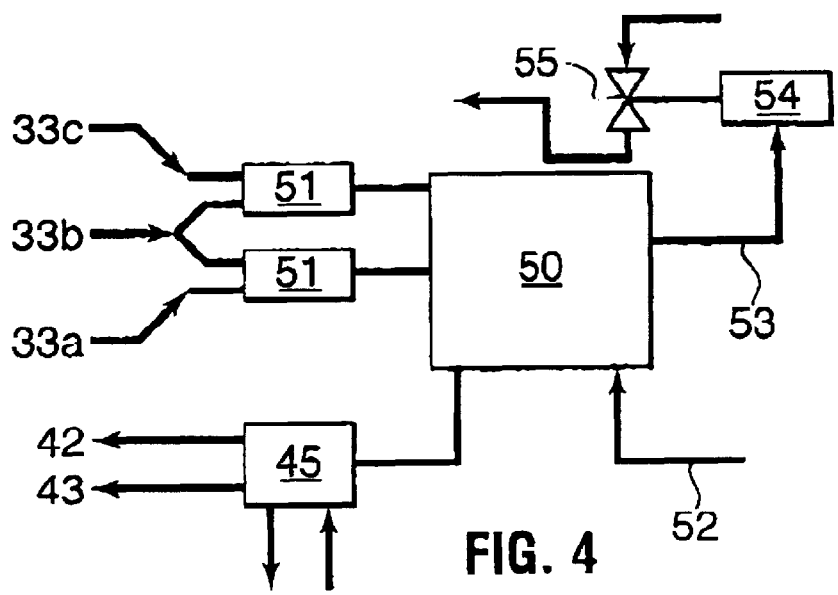
FIG. 4 is a block diagram of a preferred control system (including coolant control features) that may be used with the present invention.

A typical circuit to control the movement of the probes and to make the coordinated measurements is described with reference to FIGS. 2 and 3 and the block diagram of FIG. 4. The signal analysis and timing signals required for the temperature measurements are provided by a common digital computer 50. The computer generates a "start" timing signal which activates a four-way solenoid 45, which applies air pressure to the common pneumatic connection 43 for all probe contacts to drive the contacts into the slab surface. A similar "stop" timing signal causes the solenoid to apply air pressure to connection 42 to reverse the movement. The unused connection (42 or 43) is connected to atmosphere by means of the solenoid.

Continuously operating analogue to digital (A/D) converters 51 are connected to pairs of outputs of the probes. Connections 33a and 33b feed one such A/D converter 51 and connections 33b and 33c feed the other. The A/D converters are capable of making at least 40 reading per second, and of converting the emf's thus read into digital signals. These signals are fed as inputs to the computer 50.

The computer converts the digital inputs from each contact pair into temperatures $T_1$ and $T_2$ based on known conversion factors for the contact alloys selected. Digital inputs are accepted from 0.35 seconds following the "start" timing signal until the "stop" timing signal is generated. This covers both the response time of the thermocouple junctions (about 0.15 seconds) and that of the valves. The data for $T_1$ and $T_2$ may be treated in a variety of ways. In one method, the maximum, minimum and averages of $T_1$ and $T_2$ are determined for the entire time cycle between "start" and "stop" timing signals. If the average values differ by a fixed amount (for example 10%, preferably 5%), the entire cycle is rejected for control purposes. If the signals vary by less than this amount, the higher of the $T_1$ and $T_2$ maximum, minimum or average will generally be chosen as a representative measurement of the surface temperature. Alternatively, the values of $T_1$ and $T_2$ may be compared on a measurement by measurement basis (e.g. at a rate of 40 per second) and individual pairs rejected or accepted.

The length of the measurement cycle (between "start" and "stop" timing cycles) may be selected to fit operational requirements, provided of course that the probe contacts are not required to move vertically beyond their operating limits. In addition, movement beyond about 3 mm for measurements taken at specific locations with respect to a coolant impingement point may give less representative results than are desirable.

The rapid equilibration and frequent temperature measurements permit tracking of surface temperature variations that occur relatively rapidly, for example, during pulsed water cooling, where the pulse on or off period may be less than 0.5 seconds. The ability to rapidly equilibrate combined with the short period of in-out movement and the ability to verify the validity of each measurement as it is made, permits an excellent distance resolution along the slab over which temperatures are being measured. For example, at typical casting speeds for sheet ingot, a distance resolution as low as 0.5 mm is feasible, permitting monitoring of temperature changes over very short distances along an ingot, particularly during start-up.

By using this comparative technique, the surface temperature can be reliably determined, even when the ingot surface is rough and non-uniform and while the ingot temperature may be undergoing significant changes as in the very start of the cast. Conventional temperature measurements based on single thermocouples or a simple pair of probes cannot validate a measurement except by comparison to the previous and subsequent measurements and in situations where the surface temperature is changing, this cannot be done reliably.

When pulsed water control is used in DC casting, it is convenient to choose a measurement cycle equal to the cycle time of the pulsed water control system. The response of the system is sufficiently fast and accurate that the ingot surface temperature fluctuations during such a cycle can be tracked.

The computer 50 has a second input 52 which provides a measurement of the ingot length 13. This measurement is often generated by the control systems on modern ingot casting machines and therefore is readily available for use.

The computer then compares the validated ingot surface temperature measurements against predefined limits in the form of a control band of temperatures versus position. This control function is generally stored in the memory of the computer, for example, as a digitally stored function. The computer then provides a control signal 53 which is delivered to a device normally used to control the coolant (e.g. its flow rate, pulsation rate, gas content, etc.) in modern casting systems. The control signal is however used to modify the normal coolant control function so as to maintain the measured temperature within the defined control band. The coolant may be controlled in several ways. The pulse rate and on-off cycles can be used in pulsed water systems, the amount of gas added can be used in a gas injection system, or the total flow of coolant can be controlled, and depending on the mould design, the water impingement point and angle may be varied about the normal value. In FIG. 4, a water control system 54 is shown in block form which is used to control a water control valve 55 in a pulsed water mode (i.e. corresponding to valve 19 in FIG. 1). The water control system opens and closes the water control valve according to a pre-determined sequence. For example, the water valve operates for a predefined "on" and "off" period which can vary with the extent of the cast length of ingot, ultimately reducing the "off" period to zero ("end of pulsation"). Imposition of the control signal causes the "on" period to increase and/or the "off" period to decrease if the measurement of the surface temperature indicates that more cooling is required to bring the surface temperature down to within the control band, such a modification occurring on top of the predefined variation already part of the existing coolant control system. The controller 54 and valve system 55 may also form part of a gas delivery system if gas is delivered to the coolant to control its cooling capabilities.

Figure 5:
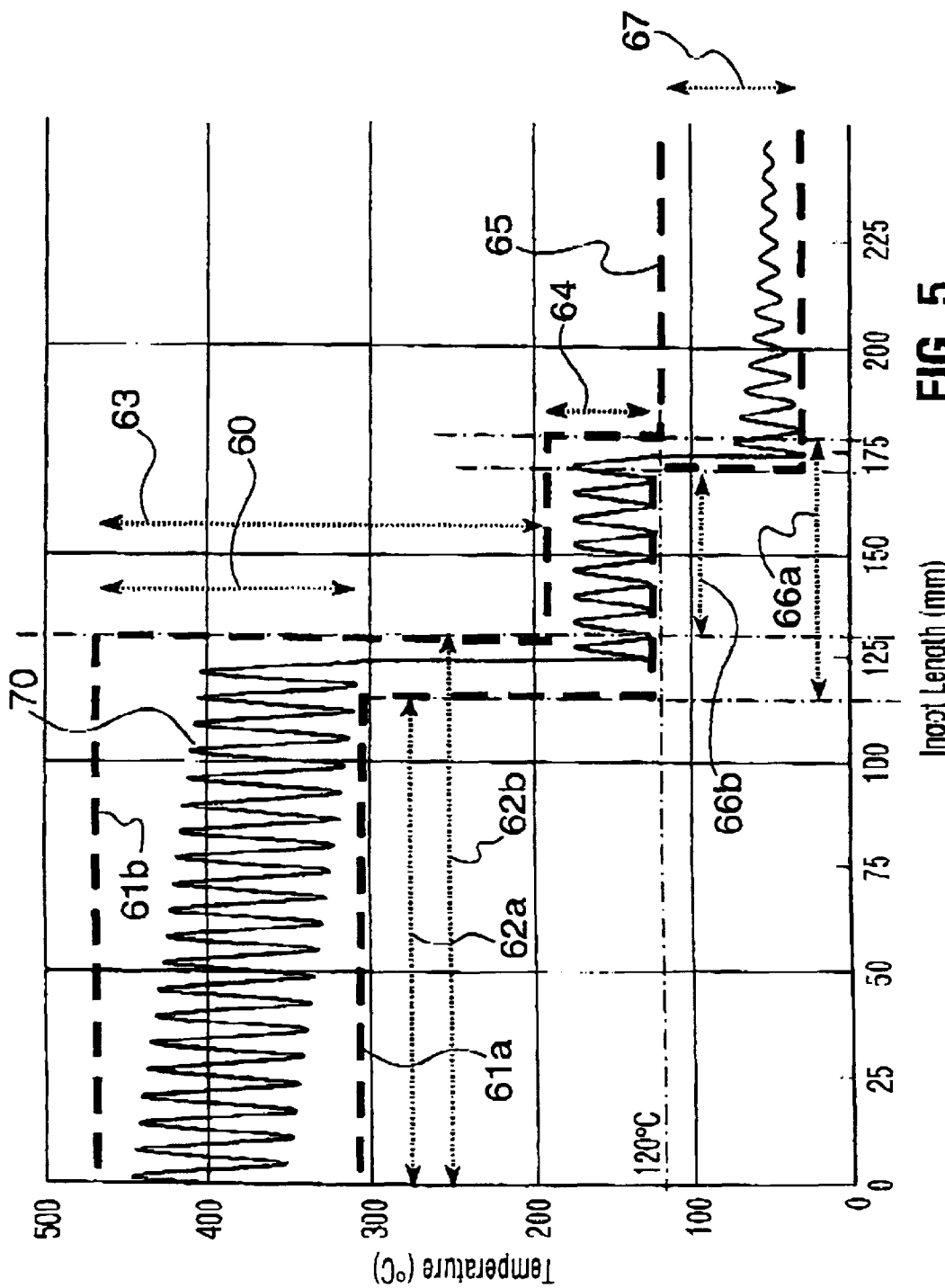
FIG. 5 shows a typical control band for use with a control system of the invention.

One typical temperature control band is illustrated in FIG. 5. It consists of a two sections. Starting from the zero value of the ingot length as already defined, a first section 60 is defined, having its lower bound 61a approximately 300° C. and extending for a shorter ingot length 62a, and an upper bound 61b of approximately 475° C. extending over a longer ingot length 62b. In the illustration of FIG. 5, the ingot lengths 62a, 62b correspond approximately to 113 to 130 mm of ingot length respectively. Thereafter, a second section comprising three more or less rectangular bounded segments 63, 64, 67 with decreasing upper bounds is defined. The final segment 67 has an upper bound 65 at a temperature of 120° C. The preceding segments 63, 64 have lower bounds above 120° C. This final segment 67 begins at a maximum incremental ingot length 66a from the end of the shorter ingot length 62a and at a minimum incremental ingot length 66b from the longer ingot length 62b of the first section. In the illustration of FIG. 5, the incremental ingot lengths 66a and 66b correspond approximately to 40 mm and 61 mm respectively. Thus for the illustrated temperature control band, the ingot surface temperature is maintained within the first section at a temperature between 300° C. and 475° C. for an ingot length of between 113 and 130 mm, then is reduced to 120° C. in an additional incremental ingot length of between 40 and 61 mm, thus falling within the preferred ranges of this invention.

Although not wishing to be bound by any theory, it is believe that the specific temperature measurement location is important in that it provides the most useful characterization of the total cooling of the ingot (primary, secondary and bottom block cooling) and thus the most useful characterization of the thermal stresses which cause cracking of the ingot. Within the first section of the control band, the ingot length over which the surface temperature in maintained at a high value is believed to be important in controlling "transitional cracking." If too short for a given ingot size and alloy, there is insufficient stress relief in the ingot, and on moving to the second section of the control band the rapid temperature change causes cracking. During the period of control in the first section of the control band, hot cracking is frequently observed, which may assist in stress relief. These hot cracks generally "heal" when subjected to rapid cooling at the change to the second control band. However, if the temperature is maintained at a high value over ingot lengths are too large, these hot cracks can develop further, and will not heal. Thus, upper and lower limits on the ingot length of this first section is desirable, and is dependent on ingot dimensions and composition (being the key aspects along with temperature which determine stress levels).

FIG. 5 is further illustrative of a pulsed cooling type of control and it is noted that the control system is intended to maintain the measured temperature 70 within the control band at all parts of the pulse cycle. If the temperature falls below the lower bound of the first section of the control band during a portion of the cycle and this is repeated for one or two additional cycles, the heat transfer process to the ingot surface may change suddenly, causing an accelerated drop in surface temperature and can initiate a failure of the ingot through cracking. This is particularly the case if the lower limit of the first section of the temperature control band is close to the lower limit of the film boiling regime. Thus a rapid, verifiable and nearly continuous surface temperature measurement must be available for this control method to operate properly. At the end of the second control band, the pulsed water is stopped, but some small fluctuations of temperature (e.g. ±5° C.) remain and are believed to be caused by the interaction of primary cooling and the ingot surface. The final portion of the control band is set to accommodate these normal fluctuations.

The control band as described in FIG. 5 will be dependent on the alloy being cast and the size of the ingot. Generally, when crack-prone ingots are involved, the ingot lengths 62a and 62b will be at least about 100 mm and less than about 400 mm. The first section of the control band will have as its lower bound a temperature of at least 200° C. and preferably between 240° C. and 450° C. The upper bound of this first section of the control band will generally be less than about 550° C.

The second section of the control band will bring the ingot to a temperature within its final section (having an upper bound less than 120° C. and preferably less than the coolant atmospheric boiling point) preferably within incremental ingot lengths 66a, 66b which lie between 5 to 100 mm following the end of the first section of the control band.

Figure 6:
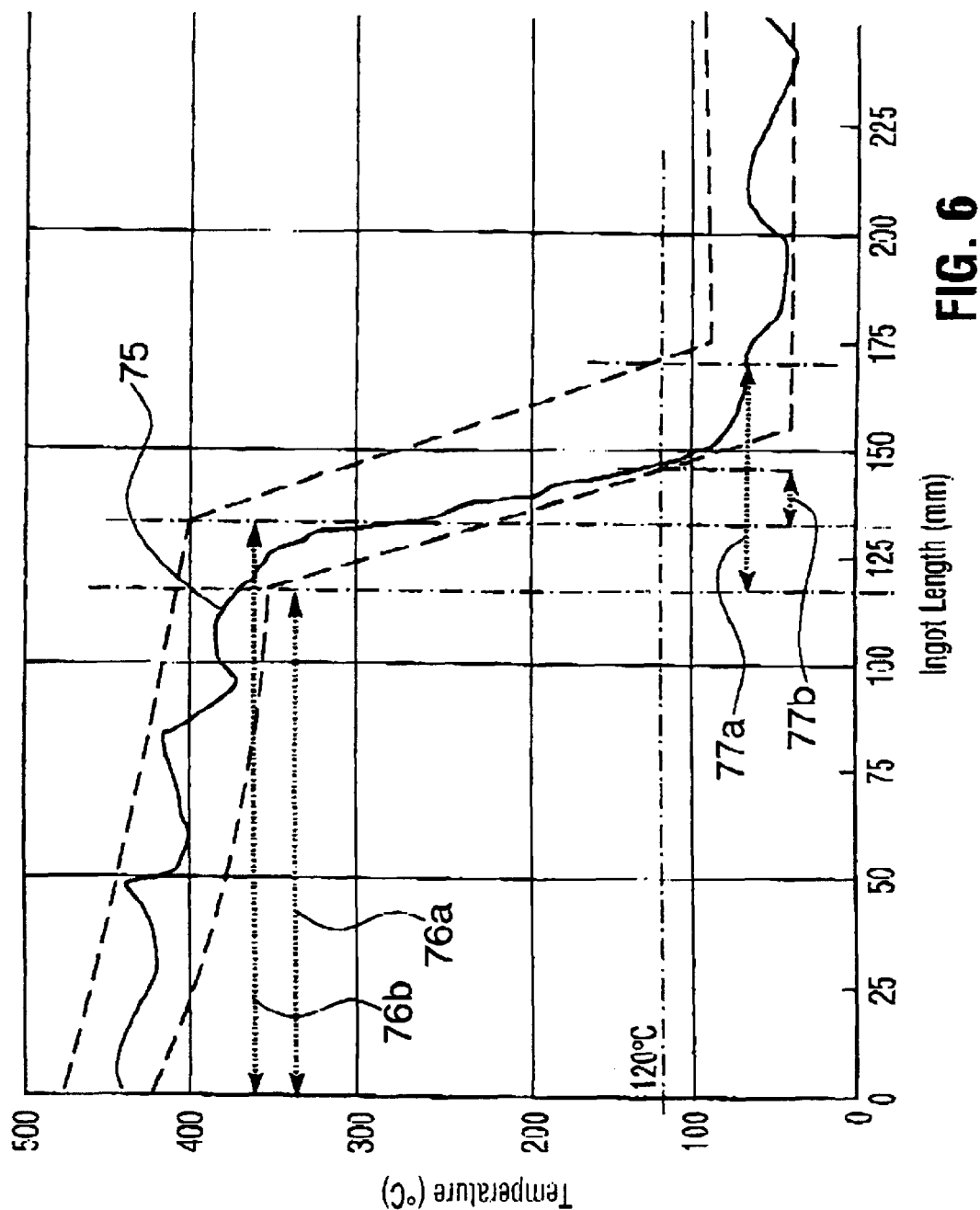
FIG. 6 shows a second example of a typical control band for use with a control system of the invention.

A different form of control band is shown in FIG. 6. In this case, a non-pulsed method of coolant control is used. The first section of the control band has boundaries in the form of decaying functions of distance, but the lower boundary remains above about 350° C., and the upper boundary is less than about 480° C. The surface temperature is maintained within these limits for an ingot length ranging from the shorter ingot length 76a, to the longer ingot length 76b which, in the illustration of FIG. 6 are approximately 116 and 132 mm respectively. The temperature is then reduced to 120° C. in additional incremental ingot lengths ranging from a maximum incremental length 77a to a minimum incremental length 77b, which are approximately 54 mm and 13 mm respectively. The second section of the control band in this case has upper and lower bounds as straight line sloped segments followed by horizontal line segments lying below 120° C. Because the temperature fluctuations 75 of pulsed water do not need to be accommodated, the control band may be narrower as shown in this Figure.

This narrower control band may also be used with pulsed water if the maximum temperatures (at the peaks of the pulses as illustrated in FIG. 5) are used. Because the apparatus of the present invention permits tracking of the temperature variations through a pulse, the maxima can readily be determined and tracked. However, in the first section of such a control band, the lower limit must be made sufficiently high that the risk that the temperatures at the minima fall below the film boiling regime are minimized. Thus a lower limit would be chosen to be higher, for the same ingot size and alloy than shown in FIG. 5 where the entire variation in temperature is tracked.

EXAMPLE

Figure 7:
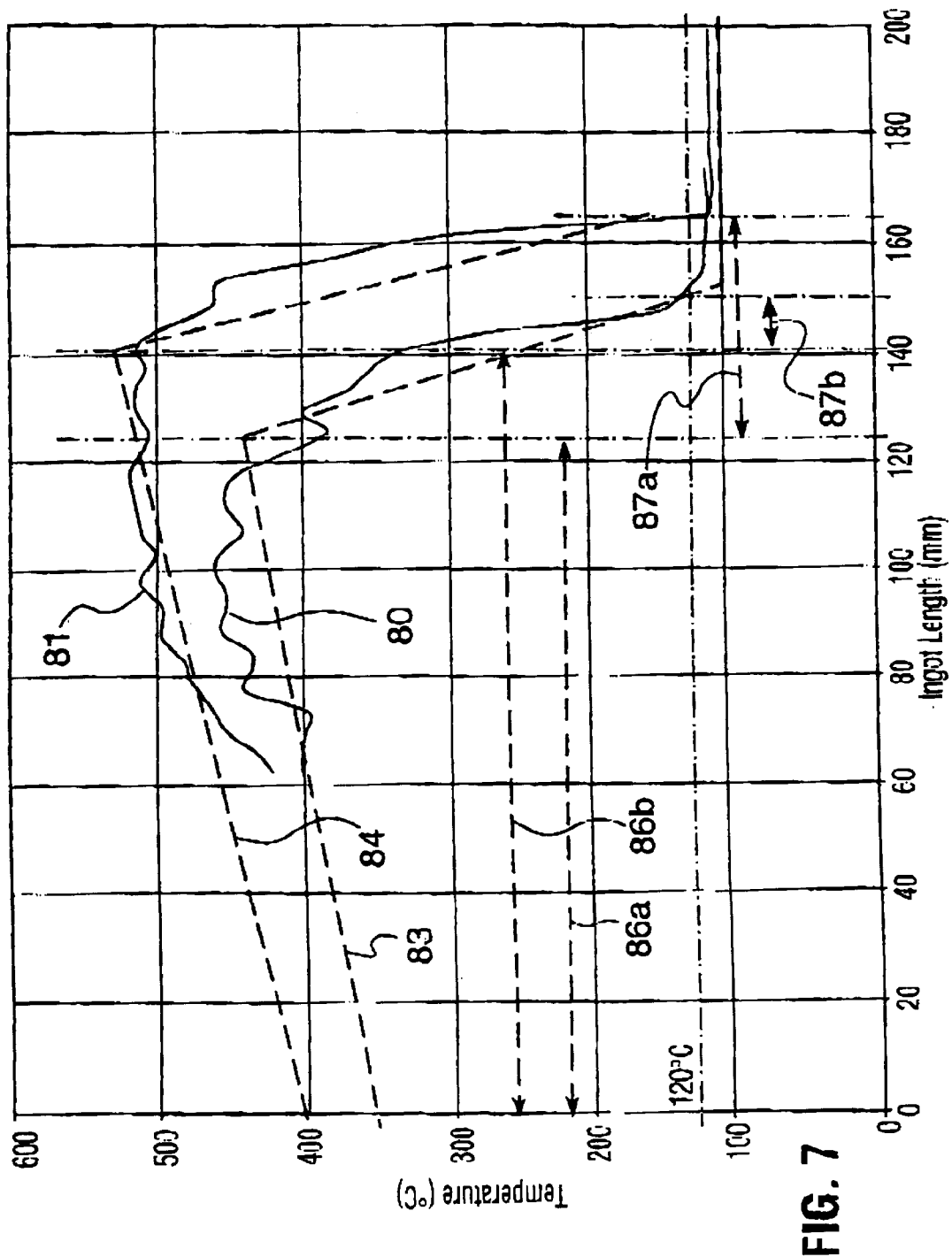
FIG. 7 shows an empirically derived control band for aluminum alloy AA3104 for use with a control system of the invention and one ingot size.

A control function suitable for use in the present invention was generated empirically. An ingot of aluminum alloy AA-3104, have a cross-sectional size of 600 by 1850 mm was cast in a casting machine using a secondary cooling modified, during the start-up phase, by gas injection. Using the embodiment of the temperature measurement probe illustrated in FIGS. 2 and 3, with the probe location 10 mm below the secondary coolant impingement point, the surface (skin) temperatures of the ingot were measured at the midpoint of the rolling face (the long side) for a series of casts. The probe was not activated immediately on start up, but commenced measurements at 70 mm of ingot length (as measured by the bottom block displacement as defined in FIG. 1). Measurements were continued up to an ingot length of about 200 mm at which point the cast was considered to have achieved a steady state operation. For each cast, the start-up cooling practice was varied and the temperature profile was measured starting in a region where the temperature was at a high value (low cooling rate) and ending after the cooling rate had been increased (by reducing the amount of gas addition to zero). Because the coolant properties were at the same time undergoing changes due to compositional variations, a substantial variety of temperature profiles were obtained. Upon completion of the start-up phase, the ingot was examined and casting process was reviewed. The temperature profiles were sorted according to the results. It was determined that temperature profiles lying between the curves 80 and 81 in FIG. 7 were consistent with good quality ingots which were cast without operational difficulties. Curves lying below curve 80 resulted in ingots having increasingly severe butt curl problems whereas those lying above curve 81 exhibited increasing rolling face transition tears. These two curves were approximated by a control band outlined by two curves 83, 84 comprised of straight lines segments to form "universal" control function. This control function is therefore suitable for casting any ingot of AA3104 having a cross section 600 by 1850 mm, in any casting machine. Provided the ingot surface (skin) temperature measured at the preferred location with respect to the secondary coolant impingement point is maintained within the band defined by the dashed lines 83 and 84, by adjusting the cooling capability of the secondary coolant by any of the methods described above, a sound ingot will be cast. The above universal control band is characterized as having a first section where the surface temperature is maintained within the lower and upper limits for ingot lengths ranging from the shorter ingot length 86a to the longer ingot length 86b equal to 124 mm and 157 mm respectively, where the lower limit of the first section of the control band is in the form of a straight line segment lying between 350 and 450° C., and the upper limit of the first section of the control band is in the form of a straight line having a maximum value of about 530° C. The second section of the control band is in the form of a first step (having sloped straight line boundaries) which reduces the ingot skin temperature to less than 120° C. in incremental ingot length ranging from a maximum additional increment 87a to a minimum additional increment 87b having values of 41 mm and 9 mm respectively. Thus this control band lies within the preferred values of the present invention. Other such "universal" control bands may be developed for different alloys and different ingot sizes.

What we claim is:

1. A method of controlling a temperature of a surface of a direct chill cast ingot cast in a casting machine having an open-ended mould provided with a bottom block during early stages of casting as said ingot emerges from said open-ended mould, the method comprising:

directing a flow of a coolant onto at least one surface of an ingot emerging from an open-ended mould to impinge on said surface at a normal impingement point and to cool said surface, measuring a surface temperature on said emerging ingot at at least one measurement location which is at a predetermined position sufficiently close to said normal impingement point that said surface temperature is affected by said flow of coolant, to generate a measured surface temperature, determining the length of said ingot, being the displacement of the bottom block of said casting machine from an initial position at the start of the cast, corresponding to each said surface temperature measurement, and using said measured surface temperature to control a casting variable and thereby to control said temperature of said surface.

2. The method of claim 1, wherein the said measured surface temperature of the ingot is used to control the surface temperature such that the surface temperature lies within a temperature control band having a first section over a first ingot length and an adjacent second section at a larger ingot length than the said first section, wherein the surface temperature is controlled within the said first section such that the surface temperature is greater than a lower temperature limit which exceeds 120° C. and less than an upper temperature limit for said first ingot length, and the surface temperature is controlled within the said second section so that the surface temperature is reduced to 120° C. within an additional incremental ingot length, and thereafter maintained below 120° C.

3. The method of claim 2, wherein said lower temperature limit of the said first section is greater than an upper limit of a nucleate boiling regime of said coolant.

4. The method of claim 2, wherein said lower temperature limit of the said first section is greater than 200° C.

5. The method of claim 2, wherein the said first ingot length is greater than about 100 mm and less than about 600 mm.

6. The method of claim 2, wherein the said additional incremental ingot length lies in the range 5 to 100 mm.

7. The method of claim 1, wherein an ingot is first cast according to a first cooling sequence, followed by:

determining for the said first cast a set of parameters comprising at least one parameter selected from the group consisting of (a) the specific first ingot length at which the said measured temperature falls sharply, determined by a maximum in a derivative of the measured temperature, (b) the value of the said measured temperature at the said specific first ingot length, (c) a single parameter selected from a group consisting of an average, a gradient, or an integral of the said measured surface temperature for ingot lengths up to the said specific ingot length, and (d) the specific increment of ingot length over which the measured temperature falls from the value at the said specific first ingot length to a value less than 120° C., comparing said parameters to a known set of parameters, and changing the cooling sequence for a subsequent ingot cast according to the difference between the said set of parameters and the said pre-determined set of parameters.

8. The method of claim 7, wherein the said casting variable is selected from the group consisting of molten metal temperature, casting speed, and degree of cooling by the coolant stream used to provide secondary cooling to the mould.

9. The method of claim 7, wherein the said casting variable is the degree of cooling provided by the coolant stream used to provide secondary cooling to the mould.

10. The method of claim 1, wherein the said surface temperature is measured using a sensor selected from the group consisting of non-contact optical sensors and contact temperature measuring sensors.

11. The method of claim 1, wherein said surface temperature is measured by providing at least two contact temperature sensors at said measurement location, periodically bringing said sensors into simultaneous contact with said surface, comparing outputs from each of said sensor, rejecting said outputs if said outputs differ by more than a fixed amount and, if said outputs differ by less than said fixed amount, accepting one or an average of said outputs as a measure of said temperature to be used for control of said coolant.

12. The method of claim 11, wherein said outputs include an output that indicates a higher temperature than others of said outputs, and accepting said higher output as a measure of said surface temperature when said outputs differ by less than said fixed amount.

13. The method of claim 11, wherein said sensors have at least two spaced point contacts made of different metals to generate an emf when in contact with said surface.

14. The method of claim 1, wherein said predetermined position lies between 5 mm above the normal impingement point to 400 mm below the normal impingement point.

15. The method of claim 1, wherein said predetermined position lies between 5 mm above the normal impingement point to 100 mm below the normal impingement point.

16. The method of claim 1, wherein said predetermined position lies between 5 mm above to 30 mm below said normal impingement point.

17. The method of claim 1, wherein said coolant is controlled by a method selected from the group consisting of varying on-off cycle times of a pulsating coolant flow, altering a total flow of coolant, adding gas to said coolant and varying the gas constant, directing said flow of coolant away from said normal impingement point, and adding additives to said coolant and varying the content of said additives.

18. An apparatus for controlling a temperature of a surface of a direct chill cast ingot during early stages of casting from a casting machine having an open-ended casting mould, said apparatus comprising:

an open-ended casting mould;

at least one surface temperature sensor located at a predetermined position with respect to a normal secondary coolant impingement point established for said casting mould, said at least one temperature sensor forming part of a control system for controlling said surface temperature of said ingot, and generating a signal;

a signal conditioner for validating said signal by testing said signal for accuracy and/or precision and if validated, providing an output representative of the surface temperature of said ingot;

a signal comparator which receives said output of said signal conditioner and compares said output of the signal conditioner to a predetermined control function; and a controller for controlling a casting variable of said casting mould in response to an output of said signal comparator.

19. An apparatus as in claim 18 wherein the said temperature sensor is selected from the group consisting of non-contact optical sensors and contact temperature measuring sensors.

20. An apparatus as in claim 18 wherein there are at least two temperature sensors located adjacent to each other, and wherein said signal conditioner is a signal comparator for comparing an output of each of said at least two temperature sensors and said validation occurs when said signals differ by less than a fixed amount.

21. The apparatus of claim 18, wherein said at least one temperature sensor comprises a two-point contact probe, each point being made of a different metal such than an emf is developed when said points are contacted with said surface.

22. The apparatus of claim 21, wherein there are at least two sensors and adjacent sensors share a point contact.

23. The apparatus of claim 21, wherein each point of said sensor has independent suspension to adapt to irregularities of said surface of said ingot.

24. The apparatus of claim 18, wherein said casting variable is the coolant flow or properties and the means for controlling said coolant flow or properties is selected from the group consisting of a device for varying on-off cycle times of a pulsating coolant flow, a device for altering a total flow of coolant, a device for adding gas to said coolant and varying the gas constant, a device for directing said flow of coolant away from said normal impingement point, and a device for adding additives to said coolant and varying the content of said additives.

25. A method of measuring a surface temperature of a metal ingot as it is cast from an open-ended casting mould, comprising:

measuring a temperature of said surface at a location on said ingot using a first temperature sensor to obtain a first temperature measurement;

measuring a temperature of said surface at said location on said ingot using a second temperature sensor to obtain a second temperature measurement;

comparing said first temperature measurement and said second temperature measurement;

ignoring said temperature measurements if said first and second temperature measurements differ by more than a predetermined amount;

selecting one or an average of said first and second temperature measurements as a representation of said temperature of said surface at said location if said first and second temperature measurements differ by less than said predetermined amount.

26. A method as claimed in claim 25 wherein said mould includes a controller for controlling a casting variable of the casting mould, and wherein said selected temperature measurement is used by said controller to modify said casting variable when necessary to establish a predetermined surface temperature of said ingot as casting proceeds.

27. A method as claimed in claim 26, wherein said mould includes secondary cooling equipment for said ingot and said selected temperature is used by said controller to modify said secondary cooling equipment to maintain said predetermined surface temperature.

* * * * *